(12) United States Patent
Venkatachary

(10) Patent No.: US 7,917,694 B1
(45) Date of Patent: Mar. 29, 2011

(54) METHOD AND SYSTEM FOR FINDING MAXIMAL STRIPES IN CACHE MEMORY WITH CONTENT ADDRESSABLE MEMORY

(75) Inventor: Srinivasan Venkatachary, Sunnyvale, CA (US)

(73) Assignee: Netlogic Microsystems, Inc., Santa Clara, CA (US)

( * ) Notice: Subject to any disclaimer, the term of this patent is extended or adjusted under 35 U.S.C. 154(b) by 766 days.

(21) Appl. No.: 11/207,323

(22) Filed: Aug. 18, 2005

Related U.S. Application Data

(60) Provisional application No. 60/612,905, filed on Sep. 23, 2004.

(51) Int. Cl.
*G06F 12/00* (2006.01)

(52) U.S. Cl. ........ 711/113; 711/108; 711/111; 711/112; 711/118; 711/133; 711/135; 711/154; 711/159; 365/49.1

(58) Field of Classification Search .................. 711/108, 711/111–113, 118, 133, 135, 154, 159; 365/49.1
See application file for complete search history.

(56) References Cited

U.S. PATENT DOCUMENTS

| | | | |
|---|---|---|---|
| 5,608,891 A | 3/1997 | Mizuno et al. | |
| 5,758,148 A | 5/1998 | Lipovski | |
| 5,777,608 A | 7/1998 | Lipovski et al. | |
| 5,778,426 A * | 7/1998 | DeKoning et al. | 711/122 |
| 5,860,091 A | 1/1999 | DeKoning et al. | |
| 5,974,503 A | 10/1999 | Venkatesh et al. | |
| 6,038,570 A | 3/2000 | Hitz et al. | |
| 6,081,440 A | 6/2000 | Washburn et al. | |
| 6,108,227 A | 8/2000 | Voelkel | |
| 6,138,126 A | 10/2000 | Hitz et al. | |
| 6,240,000 B1 | 5/2001 | Sywyk et al. | |
| 6,253,280 B1 | 6/2001 | Voelkel | |
| 6,266,262 B1 | 7/2001 | Washburn et al. | |
| 6,374,326 B1 * | 4/2002 | Kansal et al. | 711/108 |
| 6,420,990 B1 | 7/2002 | Voelkel | |
| 6,480,406 B1 | 11/2002 | Jin et al. | |
| 6,502,163 B1 | 12/2002 | Ramankutty | |
| 6,504,740 B1 | 1/2003 | Voelkel | |
| 6,505,270 B1 | 1/2003 | Voelkel et al. | |
| 6,515,884 B1 | 2/2003 | Sywyk et al. | |
| 6,647,457 B1 | 11/2003 | Sywyk et al. | |
| 6,661,716 B1 | 12/2003 | Sywyk et al. | |
| 6,697,275 B1 | 2/2004 | Sywyk et al. | |
| 6,704,837 B2 * | 3/2004 | Beardsley et al. | 711/114 |

(Continued)

OTHER PUBLICATIONS

StatPrimer, "2: Stem-&-Leaf Plots and Frequency Tables", Jul. 16, 2001. Retrieved on Sep. 8, 2010 from <http://web.archive.org/web/20010716220437/http://www.sjsu.edu/faculty/gerstman/StatPrimer/Freq.PDF>.*

(Continued)

*Primary Examiner* — Sanjiv Shah
*Assistant Examiner* — Arpan P. Savla
(74) *Attorney, Agent, or Firm* — Haverstock & Owens, LLP

(57) ABSTRACT

A storage system and method of operating the same can speed the operation of cache management functions. Generally, a storage system can include data stored in stripes, with each stripe including a number of blocks. A cache memory can store data blocks for fast access. A method can include providing a ternary content addressable memory (TCAM) with a processor coupled thereto, and tracking a block count for each active stripe with the processor and TCAM. The block count for each active stripe can be the number of data blocks belonging to the same stripe that are stored in the cache memory.

16 Claims, 8 Drawing Sheets

U.S. PATENT DOCUMENTS

| | | | |
|---|---|---|---|
| 6,721,202 B1 | 4/2004 | Roge et al. | |
| 6,751,637 B1 | 6/2004 | Hitz et al. | |
| 6,751,755 B1 | 6/2004 | Sywyk et al. | |
| 6,763,426 B1 | 7/2004 | James et al. | |
| 6,772,279 B1 | 8/2004 | Sun et al. | |
| 6,804,744 B1 | 10/2004 | Abbas | |
| 6,845,024 B1 | 1/2005 | Wanzakhade et al. | |
| 6,876,558 B1 | 4/2005 | James et al. | |
| 6,892,273 B1 | 5/2005 | James et al. | |
| 6,903,951 B1 | 6/2005 | James | |
| 6,904,498 B2 * | 6/2005 | Stolowitz | 711/114 |
| 6,906,936 B1 | 6/2005 | James | |
| 6,938,133 B2 | 8/2005 | Johnson et al. | |
| 6,954,823 B1 | 10/2005 | James | |
| 6,958,925 B1 | 10/2005 | Om et al. | |
| 2004/0068612 A1 * | 4/2004 | Stolowitz | 711/114 |

OTHER PUBLICATIONS

U.S. Appl. No. 10/180,357, Chou, Richard.
U.S. Appl. No. 10/197,298, Sun et al.
U.S. Appl. No. 10/202,528, Zou, Janet.
U.S. Appl. No. 10/209,142, James et al.
U.S. Appl. No. 10/217,746, Chou, Richard.
U.S. Appl. No. 10/264,667, James, David.
U.S. Appl. No. 10/266,953, Wanzakhade, Sanjay.
U.S. Appl. No. 10/271,660, James, David.
U.S. Appl. No. 10/218,814, James, David.
U.S. Appl. No. 10/320,053, Wanzakhade, Sanjay.
U.S. Appl. No. 10/320,588, Wanzakhade, Sanjay.
U.S. Appl. No. 10/873,608, Meng, Anita X.
U.S. Appl. No. 10/897,062, Venkatachary, Srinivasan.
U.S. Appl. No. 10/931,960, Bettman et al.
U.S. Appl. No. 10/940,129, Narum, Steven.
U.S. Appl. No. 10/948,050, Venkatachary et al.
U.S. Appl. No. 10/950,323, Birman et al.
U.S. Appl. No. 10/977,516, Om, Hari.
U.S. Appl. No. 11/000,568, Smith, Scott.
U.S. Appl. No. 11/011,464, Smith, Scott.
U.S. Appl. No. 11/014,123, Om et al.
U.S. Appl. No. 11/043,391, Gupta, Pankaj.
U.S. Appl. No. 11/047,793, Gupta et al.
U.S. Appl. No. 11/085,399, Om, Hari.
U.S. Appl. No. 11/089,837, Smith, Scott.
U.S. Appl. No. 11/090,116, Banachowicz et al.
U.S. Appl. No. 11/146,639, Maheshwari, Dinesh.
U.S. Appl. No. 11/219,109, Maheshwari, Dinesh.
U.S. Appl. No. 60/629,694, Jiang, Bin.
U.S. Appl. No. 60/657,754, Maheshwari, Dinesh.
U.S. Appl. No. 60/661,745, Maheshwari, Dinesh.
U.S. Appl. No. 60/663,656, Maheshwari, Dinesh.
U.S. Appl. No. 60/668,875, Maheshwari, Dinesh.
U.S. Appl. No. 60/667,325, Om, Hari.

* cited by examiner

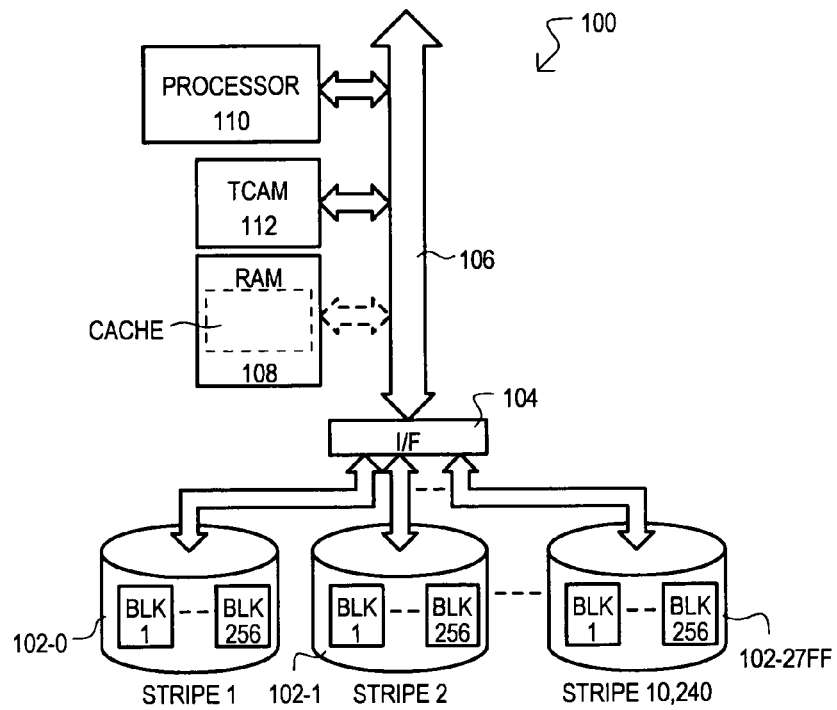
FIG. 1
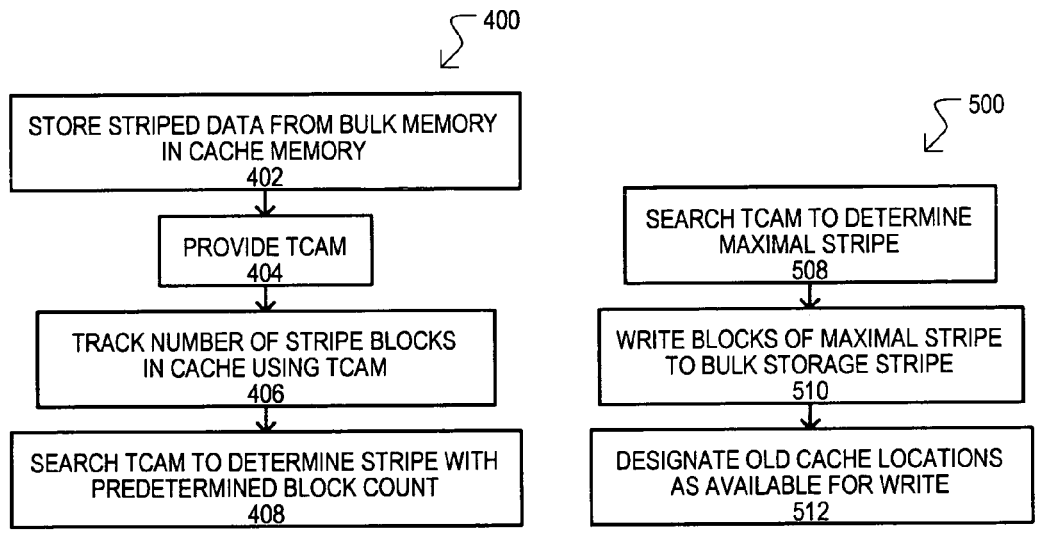
FIG. 4
FIG. 5

METHOD AND SYSTEM FOR FINDING MAXIMAL STRIPES IN CACHE MEMORY WITH CONTENT ADDRESSABLE MEMORY

This application claims the benefit of U.S. Provisional Patent Application Ser. No. 60/612,905, filed on Sep. 23, 2004.

TECHNICAL FIELD

The present invention relates generally to data storage systems that access data in stripes, and more particularly to storage systems having a cache memory that caches blocks of data contained within stripes of data.

BACKGROUND OF THE INVENTION

Data storage systems can often use a cache memory to speed process requests for frequently or recently accessed data. In such a system, bulk storage memory can be partitioned into addressable "blocks". To reduce access time for blocks of data, blocks of data recently accessed in the bulk memory can be stored in a cache memory having a faster access time. A cache memory typically has a substantially smaller capacity, thus, whenever the cache memory gets close to full (or otherwise needs to remove block data for other conditions, such as aging), blocks can be removed from the cache memory to create more space. Various algorithms are known to determine which blocks of data are to be removed from a cache memory.

In some mid- to high-end disk subsystems, data can be stored in a "striped" fashion. In a striping approach, a body of data can be distributed or interleaved over multiple storage devices (e.g., disks). Such stripes can thus be partitioned into "blocks". As but one example, an array of disks can consist of 10 k stripes, each of which can include 256 blocks, for a total of 2.56 M blocks in the entire disk array. In such a conventional approach, a cache memory can be used to store blocks of data accessed from such a disk array. At any given time, anywhere from 0 to 256 (all) blocks of a given stripe can be stored in the cache memory. In one conventional approach, for those stripes having at least one block stored within the cache memory, a count can be maintained. That is, the system can store a count value that reflects the number of blocks stored in the data cache for a given stripe.

When space in the cache memory needs to be reclaimed (e.g., to make room for new data blocks), a search can be performed to find a "stripe with maximal count". That is, find the stripe having the largest number of its data blocks stored in the cache memory. Once found, the cached data blocks for the stripe with the highest count can be written back to the bulk storage for the stripe and then removed from the cache memory.

To better understand various features of the disclosed embodiments, a conventional data storage system will now be described with reference to FIG. 10.

A data storage system 1000 can include a number of disk storage devices 1002-0 to 1002-27FF, each of which can provide a "stripe" of data. In the particular example shown, each stripe can include 256 data blocks. Stripes of data can be accessed via an interface 1004 connected to a data/address bus 1006. The system 1000 can also include a random access memory (RAM) section 1008 and processor 1010 connected to data/address bus 1006.

A RAM section 1008 can serve as a cache memory for selected memory blocks of accessed stripes of data. In addition, in the example shown, a RAM section 1008 can also include a "heap" data structure that can maintain block tracking information.

Conventionally, a "heap" data structure can be utilized to maintain a block count value for each active stripe (i.e., each stripe having at least one data block in the cache memory). Access to a "heap" data structure typically requires a binary-tree (or similar) type search. Accordingly, for N active stripes, $\log_2(N)$ steps may be required to update the data structure using a standard algorithm executed by a processor. Such steps can introduced unwanted delay into cache maintenance operations, due to the steps involved in sequentially searching through a heap type data structure. Similarly, such approaches can result in non-determinative search operations, as searching the data structure for a given block could take 1 step or $\log_2(N)$ steps.

While accesses to a heap data structure can be accelerated with specialized hardware, such approaches can add unwanted complexity to the system.

Accordingly, there is need for a system and/or method that that can store count values and/or stripe values for an associated cache that provide for faster replacement operations than conventional approaches.

For example, it would be desirable that a method accomplish a cache replacement operation in a smaller number of steps. In particular, it would be desirable for the number of steps to be independent of the total number of stripes (N), as opposed to conventional method that can require N or $\log_2(N)$ steps.

It would also be desirable that such a system and/or method utilize existing "off the shelf" devices, rather than specialized circuitry, and that the amount of extra hardware required, as compared to a conventional approach, is minimal.

It would further be desirable that such a system and/or method be fast and simple to implement with respect to existing designs.

SUMMARY OF THE INVENTION

The present invention can include a data storage system having bulk storage devices that can store a body of data over separately accessed stripes. Each stripe can include a plurality of data blocks. A cache memory can store predetermined of the data blocks. A method of cache maintenance can include providing a ternary content addressable memory (TCAM) with a processor coupled thereto. The method can also include tracking a block count for each active stripe with the processor and TCAM. The block count for each active stripe can be the number of data blocks belonging to the same stripe that are stored in the cache memory.

In such an arrangement, block count values can be rapidly determined due to the rapid search capabilities inherent in a TCAM.

According to one aspect of the embodiment, the step of tracking the block count for each active stripe can include storing at least one table in the TCAM that includes entries having block count values. In addition, the at least one table can be searched to locate an active stripe with a predetermined block count value.

In this way, a TCAM can be searched to rapidly determine the identity of a stripe having a particular count value.

According to another aspect of the embodiments, a method of cache maintenance can include a cache reclamation operation. Further, a step of searching the at least one table can include searching the at least one table to locate the active stripe having a highest count value with respect to the other active stripes.

In this way, a TCAM can be searched to rapidly determine the identity of a maximal stripe.

According to another aspect of the embodiments, a method of cache maintenance cab include a cache reclamation operation that writes the data blocks of the active stripe having a highest count value to the bulk storage stripe corresponding to the active stripe.

In this way, a TCAM can be used to speed cache reclamation operations.

According to another aspect of the embodiments, a step of tracking the block count for each active stripe can includes storing a plurality of tables in the TCAM, at least two such tables including stripe identifier values. In addition, at least one table can be stored in a random access memory that includes block count values for active stripes.

According to another aspect of the embodiments, the step of tracking a block count for each active stripe with the processor includes forming at least one table in the TCAM selected from the group consisting of: BlockTable, StripeTable and IsAnyStripeWithCount. A BlockTable can store the logical address of each data block stored in the cache memory. A StripeTable that stores the logical address of each stripe having at least one data block stored in the cache memory and the block count for the stripe. An IsAnyStripeWithCount table comprising at least M entries, where M is a maximum number of data blocks in a stripe, each entry corresponding to a block count j, and indicating if any active stripe has a block count of j.

According to another aspect of the embodiment, a logical address of a stripe (S) can be a subset of the logical address of the data block for that stripe. Further, a StripeTable can comprise a plurality of entries having at least a stripe field that stores the logical address of a stripe and a count field that stores a block count value for the corresponding stripe. The block count can represent the number of data blocks for the stripe that are stored in the cache memory.

According to another aspect of the embodiment, a block count value of a corresponding stripe can be greater than zero and no more than M, where M is a maximum number of data blocks in a stripe.

According to another aspect of the embodiments, a method can further include providing a random access memory (RAM) coupled to the processor, the RAM including at least an InverseCountArray that tracks the number of stripes having a given block count value.

The present invention can also include a data storage system. Such a system can include a plurality of bulk storage devices partitioned into a number of stripes, each stripe being partitioned into a plurality of data blocks. A cache memory can be included that has a faster access speed than the bulk storage devices. A ternary content addressable memory (TCAM) can be coupled to a processor and adapted to track the number of data blocks present in the cache belonging to each stripe, such a number being a count value of the stripe.

In this way a TCAM can be included in a storage system and speed data block tracking functions.

According to one aspect of the embodiments, bulk storage devices can comprise an array of disks.

According to one aspect of the embodiments, a TCAM can comprise at least one table formed in TCAM entries, the at least one table being searchable to locate a stripe with a predetermined count value. The TCAM entries of the at least one table can be searchable in parallel.

In this way, stripe data can be searched in parallel for faster search results.

According to another aspect of the embodiments, a predetermined count value can be a largest count value from among all of the stripes.

According to another aspect of the embodiments, a data storage system can further include a random access memory (RAM) that stores an array that tracks the number of stripes that have a given count value.

According to another aspect of the embodiments, a RAM array can comprise an InverseCountArray having at least M elements. Each element can correspond to a possible non-zero count value. The value M can be the maximum number of blocks in a stripe.

The present invention can include a data storage system having a ternary content addressable memory (TCAM) that receives search key values and outputs a highest count stripe value that identifies one of multiple stripes of data that has a highest number of data blocks stored in a cache memory. The TCAM can include a first table having TCAM entries that store count indications that identify the number of data blocks from a same stripe that are stored in the cache memory. A second table can have TCAM entries that store count indications with a stripe identifier that identifies the stripe corresponding to the count indication.

According to one aspect of the embodiments, a TCAM can further include a third table having TCAM entries that store data block identifiers for each data block stored in the cache memory.

According to another aspect of the embodiments, each entry of the first table can generate an index value that corresponds to the number of data blocks for the TCAM entry when a search key matches the entry.

According to another aspect of the embodiments, each entry of the second table generates an index value that can correspond to an associated data location storing the count indication and stripe identifier of the matching entry.

According to another aspect of the embodiments, a random access memory (RAM) can store at least one data array having entries corresponding to each possible count value, each entry indicating how many stripes have the possible count value.

BRIEF DESCRIPTION OF THE DRAWINGS

FIG. 1 is a block diagram of a data storage system according to a first embodiment of the present invention.

FIG. 4 is a flow diagram of a method of cache maintenance according to one embodiment of the present invention.

FIG. 5 is a flow diagram of a method of cache reclamation according to an embodiment of the present invention.

DETAILED DESCRIPTION

Figure 2:
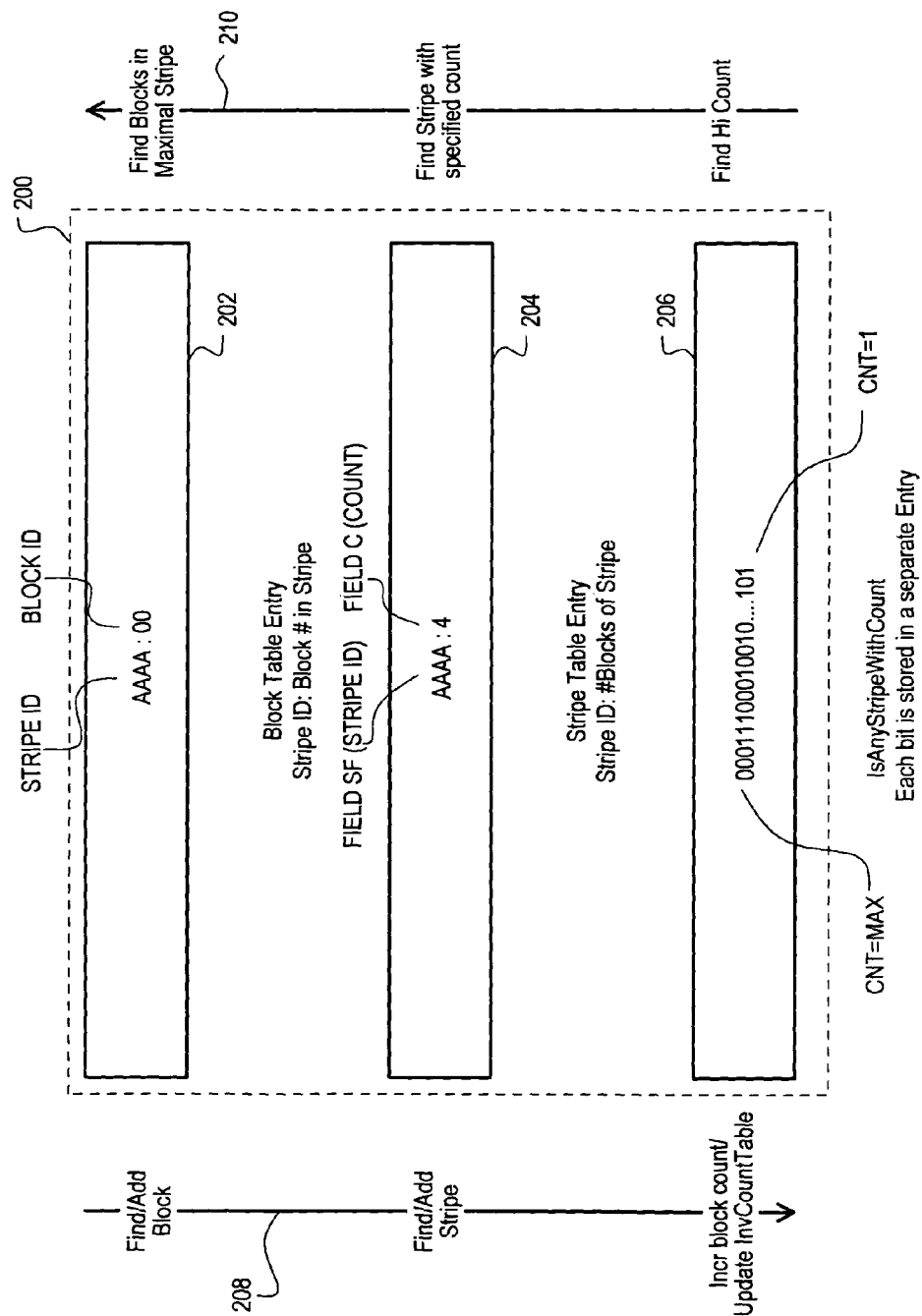
FIG. 2 is a block diagram of a content addressable memory (CAM) device, data tables, and search operations according to another embodiment of the present invention.

Various embodiments of the present invention will now be described in detail with reference to a number of drawings. The embodiments include systems and methods in which content addressable memory CAM type matching can be used to increase the speed of cache management operation, including but not limited to cache replacement operations.

Referring now to FIG. 1, a first embodiment of the present invention is set forth in a block diagram and designated by the general reference character 100. A first embodiment can include a data storage system 100 having a number of bulk storage devices 102-0 to 102-27FF, each of which can provide a "stripe" of data. In the particular example shown, each stripe (102-0 to 102-27FF) can include 256 data blocks. Stripes of data can be accessed via an interface 104 connected to a data/address bus 106. Preferably, bulk storage devices (102-0 to 102-27FF) can be disk structures employed in a disk array with bodies of data being spread over stripes.

A system 100 can also include a random access memory (RAM) 108 and a processor 110 coupled to data/address bus 106. A RAM 108 can include a cache memory that stores selected memory blocks contained within bulk storage devices (102-0 to 102-27FF), and thereby provide faster access to such data. A processor 110 can control access to RAM 108 and bulk storage devices (102-0 to 102-27FF) to thereby read data from, and write data to, the system 100.

Unlike a conventional approach, a system can further include a TCAM 112 that can store stripe and block count data. A TCAM 112 can be formed from one or more TCAM devices, preferably "off the shelf" type TCAM integrated circuits. As is well understood, a TCAM may be a device in which a specific pattern of bits, commonly known as a search key or comparand, can be compared against a set of stored entries in an associative CAM memory array. Such a CAM memory can be searched in parallel, providing extremely fast search results, as compared to algorithmic searches utilized in random access memory structures. In a TCAM each bit of an entry can store a binary "1", a binary "0", or a don't care "X" value. A don't care value provide a match indication, regardless of the corresponding search key bit value. A TCAM array may also optionally have a mask value for each entry that indicates which bit location(s) are to take place in a matching operation (global masking). That is, some CAMs referred to as "pseudo" TCAMs are considered to be TCAMs in this description. For example, a binary CAM having a global masking capability can be considered a TCAM as the term is used in this and the following description.

After a search is performed against the TCAM entries, the location of a highest priority matching entry can generate a flag to indicate that an entry value matches an applied search key. In addition, a value can be returned that corresponds to the matching entry. Such a value is sometimes in the form of an "index".

A system 100 can utilize a TCAM 112 and processor 110 coupled thereto to track a count value that represents the number of blocks present in the cache memory 108 belonging to each stripe. In such an arrangement, a system 100 can rapidly determine which stripe has a highest count value, as opposed to conventional approaches that search a heap type structure. Further, as will be described in more detail below, embodiments can utilize associated data indexed from TCAM entries to speed up various cache management operations.

Referring once again to FIG. 1, in particular embodiments, a system 100 can further include associated data (not shown) that stores additional stripe and count data. Various examples of such array data will be described in more detail below.

In this way, a TCAM can accelerate cache management operations by storing stripe and block count data.

Referring now to FIG. 2, a block diagram shows one example of tables that can be included in a TCAM 200, according to an embodiment of the present invention. The arrangement of FIG. 2 can be considered related to the embodiment of FIG. 1 in that it can represent all or a portion of data utilized to track a count value that represents the number of blocks present in the cache memory belonging to each stripe.

The very particular example of FIG. 2 shows three tables stored in a TCAM 200: a BlockTable 202, a StripeTable 204; and a table IsAnyStripeWithCount 206. FIG. 2 also illustrates usage of these tables by arrows. It is noted that embodiments can also include/utilize an array InverseCountArray that can be stored in a random access memory, such as a RAM attached to a processor.

Before continuing, it is desirable to specify certain terms used in to describe the below embodiment. An "Active Block" can be a block that is present in a cache memory. An "Active Stripe" can be a stripe that has at least one of its constituents (e.g., blocks) in the cache memory.

A BlockTable 202 can be used to hold identifier information for each Active Block, such as the logical address of each such block. Entries of the BlockTable can point to associated data, such as the physical address for the data block within the cache memory. It is also noted that a logical address for the stripe can be a subset of the logical address of the block. This particular arrangement is shown in FIG. 2, which shows a sample entry having a block identifier composed of a logical stripe address "AAAA" portion and block address portion "00".

A StripeTable 204 can be used to hold an Active Stripe identifier along with the corresponding count of Active Blocks for the Active Stripe. As but one example, each entry of a StripeTable 204 can include at least two fields: SF and C. Field SF can contain the logical address of the Active Stripe ("AAAA" in the example shown). Field C can contain a value Count ("4" in the example shown) that indicates the number of Active Blocks within that stripe.

It is noted that if a maximum number of blocks within a stripe is a number "M", all Active Blocks will have a value Count that is greater than zero, and the maximum possible Count for any active block will be M. That is, a count value for an Active Stripe will be M when all blocks of the corresponding Active Stripe are stored in the cache memory.

A table IsAnyStripeWithCount 206 can include at least M entries, one for each possible count value (i.e., 1 to M). Each entry of table IsAnyStripeWithCount 206 can hold at least two possible states, a first state (e.g., "1") representing that one or more Active Stripes has a given count value j (where $1 \leq j \leq M$) or a second state (e.g., "0") representing that no Active Stripe has the count of j. It follows that if no blocks are present in the cache, all entries within table IsAnyStripeWithCount 206 will have the second state (e.g., "0").

In one minimum implementation, a table IsAnyStripeWithCount 206 can have one bit of information for each count value j. This is represented by the collection of bits shown in FIG. 2 for IsAnyStripeWithCount 206. Each bit can represent a count value j. Thus, in the example of FIG. 2, nine count values are shown as active (e.g., "1").

As noted above, particular embodiments can include data in a RAM array in addition to tables in a TCAM. In one very particular approach, such a RAM array can be an InverseCountArray (not shown in FIG. 2). An InverseCountArray can include M elements, each of which can correspond to a possible non-zero Count value. While a Count value within a StripeTable can contain the count of active blocks within a stripe, an InverseCountArray can track the number of Active Stripes having a given count value. Thus, element "j" of InverseCountArray can store the number of Active Stripes with a count "j". It follows that when no blocks are present in the cache, all elements of an InverseCountArray can be cleared (e.g., set to 0). It also follows that if an entry in an InverseCountArray is non-zero, a corresponding entry of IsAnyStripeWithCount will be set to the first state (e.g., be "1"), and if an entry in an InverseCountArray is zero, a corresponding entry of IsAnyStripeWithCount 206 will be set (e.g., be "0").

A processor, like that shown as 110 in FIG. 1, can maintain the contents of the above tables stored in a TCAM and an array in a RAM, along with any associated data.

Referring still to FIG. 2, two general operational flows are shown by arrows. Flow 208 to the left of tables 202 to 206 shows table accesses in an operation when a new block is to be added to cache memory. In such an operation, a BlockTable 202 can first be accessed to determine if the new block is already stored in cache. If the block is not stored in cache it can be added to BlockTable 202. In addition, the corresponding stripe entry within StripeTable 204 can be updated to increase the count value of the Active Stripe. Still further, the previous count value of the Active Stripe can be decremented, and if such a value becomes zero, the corresponding count entry within table IsAnyStripeWithCount 206 can be set to zero. In a similar fashion, the current count value of the Active Stripe can be incremented, and the corresponding count entry within table IsAnyStripeWithCount 206 can be set to one.

Referring to FIG. 2 once again, flow 210 to the right of tables 202 to 206 shows table accesses in a find maximal count operation. As noted above, such an operation seeks to determine which Active Stripe has the largest number of blocks stored in a cache memory. In such an operation, table IsAnyStripeWithCount 206 can be searched with a count field (which may be a single bit) set to active (e.g., 1). According to the inherent priority of the TCAM, a "hit" will provide a highest count value from among all the Active Stripes. A "miss" will indicate no blocks are stored in the data cache.

Having acquired a highest count value, StripeTable 204 may then be searched to determine an Active Stripe having the high count. Such a search can be accomplished my masking the Stripe identifying field, and thus searching only against count values within StripeTable 204. Such a search will yield an Active Stripe identifier (e.g., logical address). Such a value can then be used for follow on operations. As but one example, BlockTable 202 can be searched against Active Stripe identifier, with the block identifier field masked. Such a search can yield the location of a block in cache memory that can be written back to a bulk memory, and then marked as available for new data. This can be repeated until all blocks of the "maximal" Active Stripe have been written to a bulk memory.

It is understood that the above determination of a maximal Active Stripe can be accomplished at a substantially faster speed than conventional algorithmic searches against a heap like data structure. Further, such searches occur at the same speed (e.g., two clock cycles when executed in parallel) regardless of the number of different count values. This can provide considerable performance advantages in cache management over conventional approaches.

Figure 3:
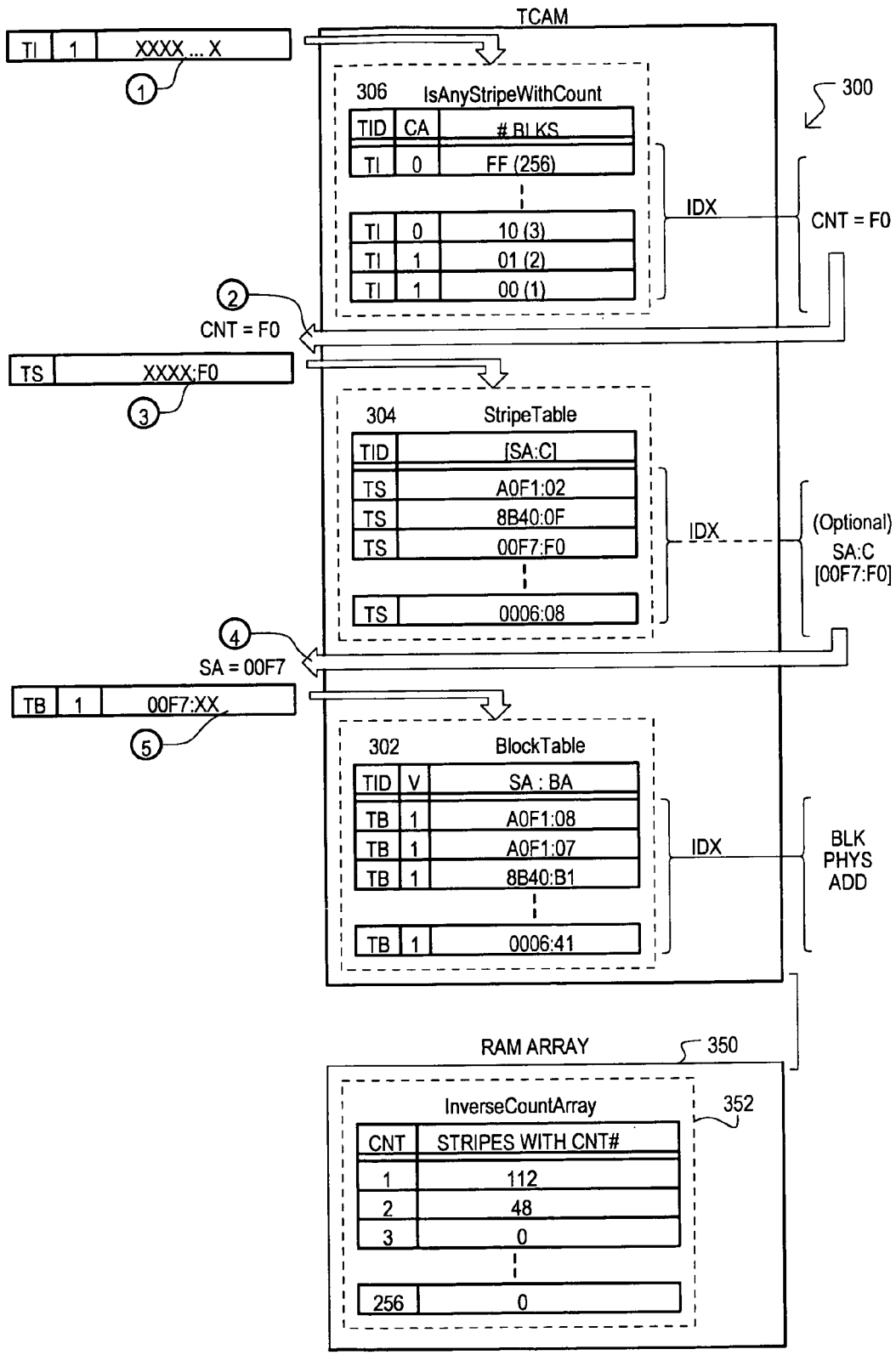
FIG. 3 is a block diagram of a CAM device, data tables, and search operations according to another embodiment of the present invention.

Referring now to FIG. 3, one very particular example of table structures stored in a TCAM and RAM is set forth in FIG. 3. FIG. 3 includes some of the same general structures as FIG. 2. Accordingly, like sections are referred to by the same reference character but with the first digit being a "3" instead of a "2". In addition, FIG. 3 shows one particular example of a RAM array 350 that includes an InverseCountArray 352. The arrangement of FIG. 3 can be considered related to the embodiment of FIG. 1, in that it can represent all or a portion of data utilized to track a count value that represents the number of blocks present in the cache memory belonging to each stripe.

In FIG. 3, differentiation between tables 302 to 306 can be accomplished with a table identifier (TID) field. As is well understood, a search key can be directed to a given table by including the appropriate TID in a corresponding field of a search key. The example of FIG. 3 illustrates an arrangement in which Active Block identifiers (B) include 4-digit hexadecimal Active Stripe logical addresses (SA), as well as a 2-digit hexadecimal address of a block within the stripe (BA). Thus, a BlockTable 302 can include entries having SA and BA values.

In FIG. 3, it is assumed that a maximum block count (C) for any given Active Stripe is 256. Thus, a count value (C) can range from 00 (hex) to FF (hex). Thus, a StripeTable 304 can include entries having SA and C values. It follows that a table IsAnyStripeWithCount 306 can index to values FF (hex) (representing a 256 count in this case) to 00(hex) (representing a 1 count in this case).

FIG. 3 also shows, in a series of steps, a search for maximal stripe operation. Each step is labeled with a circled number, and is described below.

1) A search key is applied having the IsAnyStripeWithCount table identifier (TI) and a count active field (CA) set to "1". All other fields of the search key are masked (indicate by "X").

2) Table IsAnyStripeWithCount 306 generates a hit that indexes to a count value of "F0". Due the inherent priority of the table, this value represents a highest block count from among all Active Stripes.

3) A search key can be applied having the StripeTable table identifier (TS) and a count field (C) set to "F0". The Active Stripe address field (SA) can be masked.

4) StripeTable 304 generates a hit that indexes to a highest priority address for the Active Stripe containing the count F0, which is "00F7" in the example. (This value could also be read from the TCAM entry, but such an operation may take longer than indexing to such a value).

Optionally, those blocks of the maximal stripe can be written back to a bulk memory. In such a case, the following step can be repeated until all blocks for the Active Stripe with maximal stripes have been written 5) A search key is applied having the BlockTable identifier (TB) and an Active Stripe address (SA) set to "00F7". The block address field (BA) can be masked. Such a search can yield an index to a block physical address to enable the block to be written from cache memory to bulk storage. Afterward, the entry can be set to non-valid, and the same key can search for the next block. This can be repeated until all blocks for the Active Stripe have been written to bulk storage, and all entries for such blocks have been set to non-valid.

While the above embodiments have described various systems of cache management, other embodiments can include methods for executing cache operations. Such methods will now be described below.

FIG. 4 is a flow diagram showing a general method of managing a storage system according to an embodiment. Such a method can be considered as being related to the embodiments of FIGS. 1-3 in that such a method can be executed on the systems and structures shown in such embodiments.

FIG. 4 shows a method of managing a storage system 400 in that can include storing striped data from a bulk memory in a cache memory (step 402). Each such stripe of data can include a number of blocks. Unlike conventional arrangements that may utilize only a RAM arrangement for maintaining a record of cached data blocks, a method 400 can include providing a TCAM (step 404). Also in contrast to conventional approaches, a method 400 can track the number of stripe blocks in cache (i.e., blocks of Active Stripes) using a TCAM (step 406).

A method 400 can further include searching a TCAM to determine which stripe has a predetermined block count (step 408). A block count can be the number of blocks stored in a cache memory for the given stripe.

The above described steps 402 to 408 can represent a general search operation. However, a method 400 can be used for the particular operation of cache memory reclamation. One such approach is shown in FIG. 5.

FIG. 5 shows a data reclamation method 500 according to an embodiment. The method of FIG. 5 can be considered related to that of FIG. 4 (and hence related to the other embodiments), in that method 500 can be one particular variation on step 408 of FIG. 4.

Referring to FIG. 5, a method 500 can include searching a TCAM to determine a maximal stripe (step 502). Such a step can include searching a TCAM to identify a stripe having the highest number of blocks stored in the cache. Once a maximal stripe has been identified, blocks of the maximal stripe can be written from cache memory back to bulk storage stripe (step 504). Those portions of the cache memory previously occupied by the blocks of the maximal stripe can then be designated as available for write data (step 506).

In this way, a cache reclamation method can take advantage of the fast search speeds of a TCAM to identify a maximal stripe, as well as those data blocks belonging to the maximal stripe.

More detailed methods for executing particular cache management functions will now be described.

Block Search.

Figure 6:
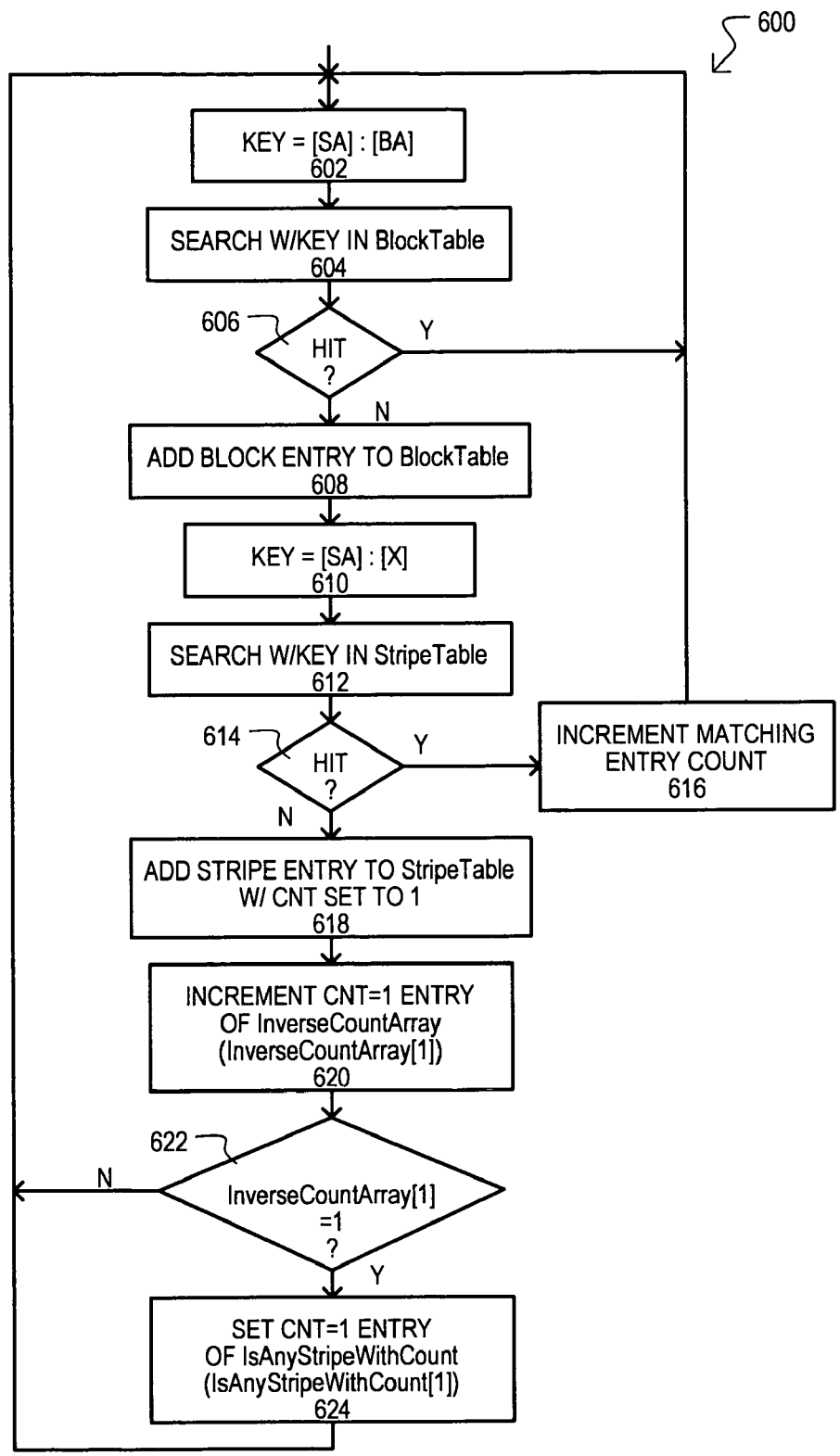
FIG. 6 is a flow diagram of a method of searching a CAM tables according to an embodiment of the present invention.

FIG. 6 shows an example of a block search operation according to an embodiment. Such a block search operation is designated by the general reference character 600 and can be considered related to the other embodiments in that such a method can be executed on the systems and structures of FIGS. 1-3, and can be one particular variation of step 406 of FIG. 4.

In the method of FIG. 6, a block address (B) is assumed to have two components, a stripe address (SA) identifying the stripe to which the block belongs, and stripe block address (BA), which indicates where in the stripe the block is stored. A method can then include searching in a BlockTable for the block (steps 602 and 604). If the block is found (Y from 606) a search can be considered successful and can end.

However, if the block is not found (N from 606) a method 600 can proceed to add the block to the tracking tables. In particular, the block can be added to an entry of a BlockTable (step 608). Such a step can include writing the key value [SA]:[BA] used in the search into the BlockTable, and can take advantage of conventional "learn" methods or learn circuitry well known to those skilled in the art.

A method 600 can also update other tables in light of the newly added block. In particular, a search can be made for the corresponding stripe of the new block in a StripeTable (step 610 and 612): Such a step can include searching with the stripe value [SA]:[X] in the table with a count field masked. If the stripe is found (Y from 614), the stripe can be a currently Active Stripe. As a result, a count value for the Active Stripe can be incremented (616). A more detailed explanation of such an increment step will be described below with reference to FIG. 7.

If the stripe is not found (N from 614), the block can be the first block of a stripe to be added to the cache memory. Thus, a new entry for the stripe can be added to StripeTable with a count value of 1 (step 618). Within an InverseCountArray, an element corresponding to "Count=1" can be incremented (step 620). If, after such an increment operation, such a count value is one (Y from 622), the new Active Stripe can be the only stripe having one block in cache (step 624). As a result, the table IsAnyStripeWithCount can be updated to ensure that the entry corresponding to one count is set active (step 624). If, after the increment operation of 620 the count value is greater than one (N from 622), the method can end, as the new block data is not accurately reflected in the TCAM tables.

Optionally, a stripe address and count value can also be stored in an associated memory location indexed by the corresponding StripeTable entry.

Increment Stripe Entry.

Figure 7:
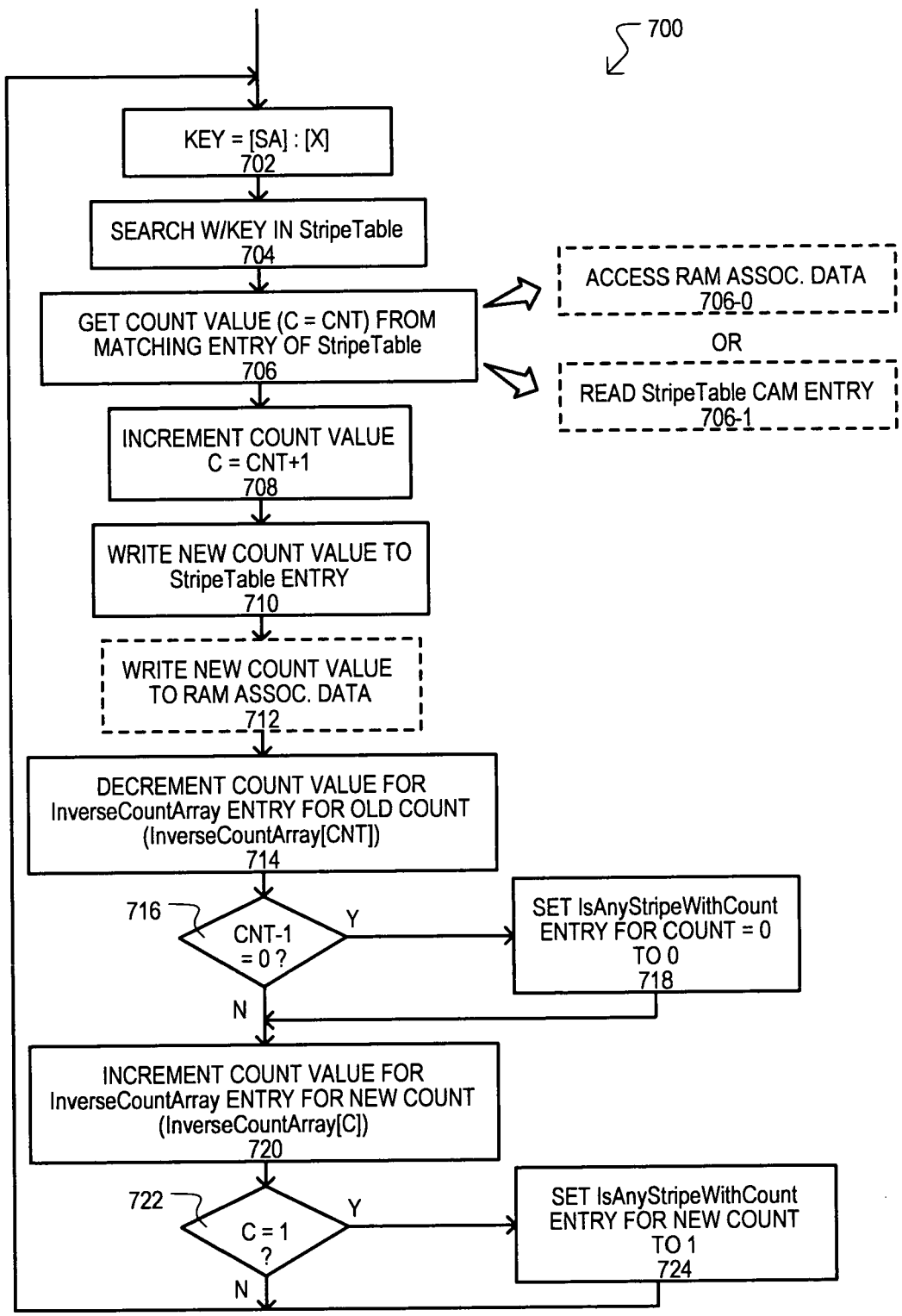
FIG. 7 is a flow diagram of a method of incrementing CAM table values according to an embodiment of the present invention.

FIG. 7 shows an example of a stripe increment operation according to an embodiment. Such an operation is designated by the general reference character 700 and can be considered related to the other embodiments in that such a method can be executed on the systems and structures of FIGS. 1-3, and can be one particular variation on step 616 of FIG. 6.

The method of FIG. 7 can include searching in a StripeTable for the entry to be updated. Such a step can include searching with the stripe value [SA]:[X] in the table (i.e., with a count field masked) (steps 702 and 704). A method can then get a count value for the matching entry from the StripeTable (step 706). A step 706 can include accessing associated data indexed by the matching entry (step 706-0) or reading data from the matching entry (step 706-1).

It is noted that reading data from a matching entry can take more time to perform than accessing associated data, as most conventional TCAMs can have a longer latency from a read request to the availability of data than other memory types that can store associated data (e.g., RAM). Further, a TCAM and associated memory are often operated in a pipelined fashion, where the match output index from a TCAM is used to directly address an associated data device. In such an arrangement, reading a count value from an associated data device can be accomplished as part of the same pipeline flow as one used to locate a stripe within a StripeTable. Thus, such an approach can be faster than reading a TCAM entry.

An accessed count value (CNT) can then be incremented (step 708). Such a new count value can then be written back into the matching StripeTable entry (step 710). Optionally, if count data is stored in associated data as noted above, such a count value can also be written to a corresponding associated memory location (step 712). It is noted that writing to a TCAM and associated memory can be accomplished in the same pipeline flow for systems organized in such a pipelined manner. Optionally, when count value is written to an associated memory location, such a value can be written in conjunction with the corresponding stripe address value. (As will be described in more detail below, such an associated data arrangement can be useful in optimizing a "Search for Maximal Stripe" operation described below).

A method 700 can further include decrementing the old count value within an InverseCountArray (step 714). If such a value, after being decremented, is zero (Y from 716), an entry corresponding to the count value within table IsAnyStripeWithCount can be set to zero as well (step 718).

If such a value, after being decremented, is not zero (N from 716) (or following a step 718), a method 700 can also include incrementing the new count value within an InverseCountArray (step 720). If such a value, after being incremented, is one (Y from 720), an entry corresponding to the new count value within table IsAnyStripeWithCount can be set to one (step 722). If such a value, after being decremented, is not one (N from 720) (or following a step 722) a method 700 can end.

Search For Maximal Stripe.

Figure 8:
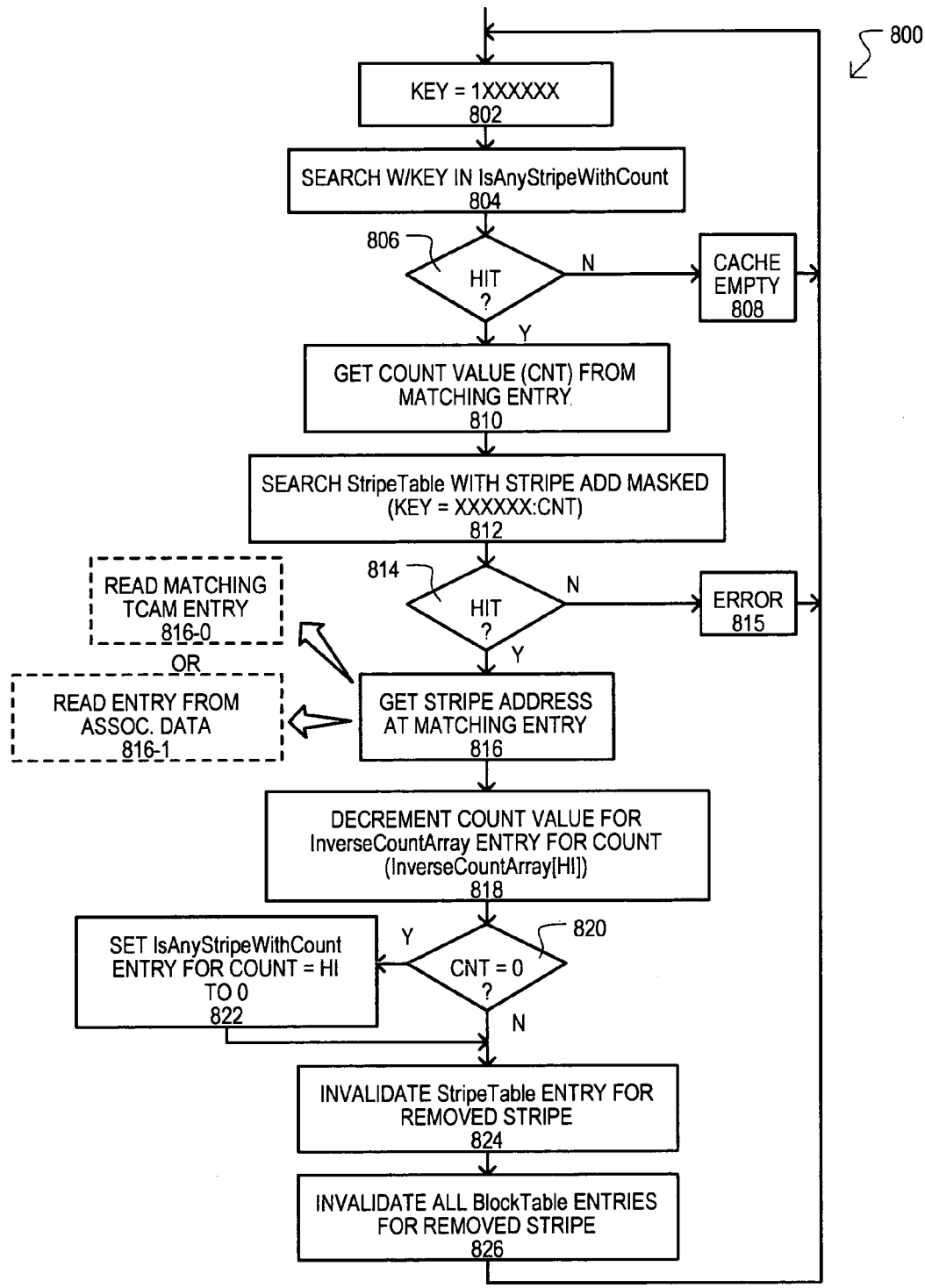
FIG. 8 is a flow diagram of a method of cache reclamation according to another embodiment of the present invention.

FIG. 8 shows an example of a search for maximal stripe operation according to an embodiment. Such an operation is designated by the general reference character 800 and can be considered related to the other embodiments in that such a method can be executed on the systems and structures of FIGS. 1-3, and can be one particular variation of step 408 of FIG. 4.

The method of FIG. 8 can include searching in table IsAnyStripeWithCount with a key set to 1 (steps 802 and 804). In the particular example shown, it can include setting one bit of the search key to "1" and the remaining bits (save a table ID, if used) to don't care "X" states. If no match results (N from 806), then the cache memory is assumed to store no blocks (step 808), and thus there cannot be a maximal stripe.

Otherwise (Y from 806), a matching index can yield a count value CNT (step 810). It is noted that, due to the inherent priority of a TCAM, an entry with a highest value (highest count) will respond with a match.

A method 800 can then search a StripeTable with a count value CNT and the stripe field masked out (step 812). If no match results (N from 814), then an error can exist 815, as the data between table IsAnyStripeWithCount can be inconsistent with that of StripeTable. However, if a match results (Y from 814), the stripe address of the matching entry can be acquired (step 816). FIG. 8 shows two possible ways in which in which step 816 can be executed. A stripe address can be accessed by reading the matching TCAM entry (step 816-0) or by reading data from an associated memory location (step 816-1). It is noted that reading associated data can be faster than accessing a TCAM entry, particularly in a pipelined operation between a TCAM and associated memory. This has been described above.

It is also understood that while a StripeTable can contain stripes containing a same number of blocks, a search operation can respond with only a single match, determined by the location of the matching entry within the TCAM.

Referring to FIG. 8, steps 802 to 816 can yield the maximal Active Stripe. If such a stripe is to be removed, additional steps can be included. For example, within an InverseCountArray the element corresponding to the count value can be decremented (step 818). If such a value, after being decremented, is zero (Y from 820), an entry corresponding to the count value within table IsAnyStripeWithCount can be set to zero (step 822).

A method 800 can then invalidate the StripeTable entry for the maximal active stripe (step 824). Such a step can include, for example, changing a valid bit for such an entry. In addition, all entries in the BlockTable corresponding to the maximal stripe can also be invalidated. For example, each such entry can be accessed one-by-one to set its corresponding valid bit to an invalid state.

It is noted that adding a new entry to any give table (i.e., learning the entry), needs to be done "coherently". That is, duplicate entries need to be avoided. One method to do this can be as follows.

It will first be assumed that an entry "B" is to be learned. If entry B is already present in a TCAM there is no need to learn the entry. To ensure duplication of entries does not occur, the following sequence can be performed: "Search B, Learn B". If a search results in a hit, then a duplicate entry has been created. This entry is then "unlearned". Unlearning an entry can include setting its valid bit to an invalid state, as but one example. The subsequent learn operation can then add the correct entry into the TCAM. With respect to this operation, it is understood that a learn operation is typically executed in response to a miss operation. Due the latency of operations involved, back-to-back misses of the same entry can trigger back-to-back learn operations for the same entry. The above arrangement can mitigate such undesirable results.

It is further noted that in addition to coherency over a single table, coherency needs to be maintained for operations over the various tables, over any associated data, and over the cache memory. A preferred method can be to perform each of the operations of adding a block to the memory cache and moving a stripe out of the memory cache as atomic (e.g., indivisible) operations.

With respect to identifying blocks with corresponding stripes, it is noted that block entries in a TCAM that belong to a certain stripe can be found by searching for the stripe value within a BlockTable with an appropriate global mask, to find a first matching entry, and the following a pointer to in associated data to the next block belonging to the stripe. Such an arrangement can require that a stripe address/identifier be a subset of a block address/identifier, or that each entry of a BlockTable includes both a stripe and block field. Alternatively, after deleting a first entry in a BlockTable, searching again can locate a next block entry for the same stripe, if present.

In an alternate embodiment, a method and cache management system can utilize an associated memory to store stripe values and/or count values.

Figure 9:
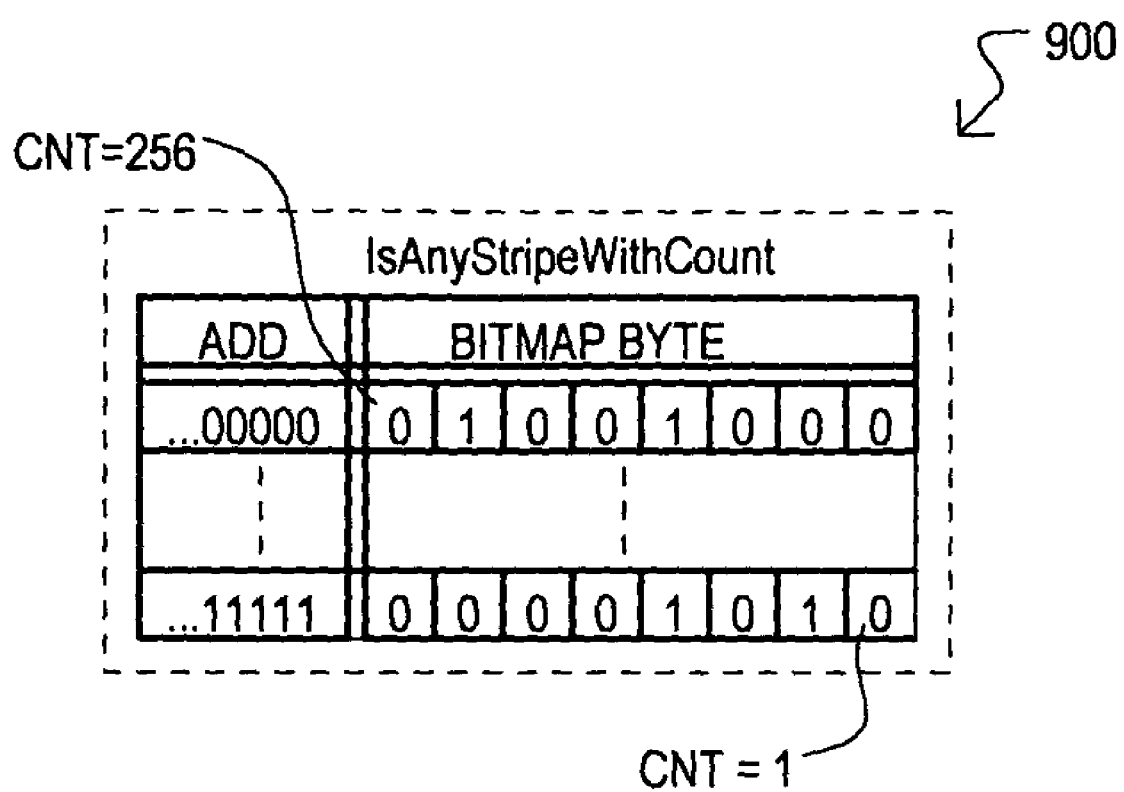
FIG. 9 is a block diagram of bit map table for storing stripe count value according an alternate embodiment of the present invention.
Figure 10:
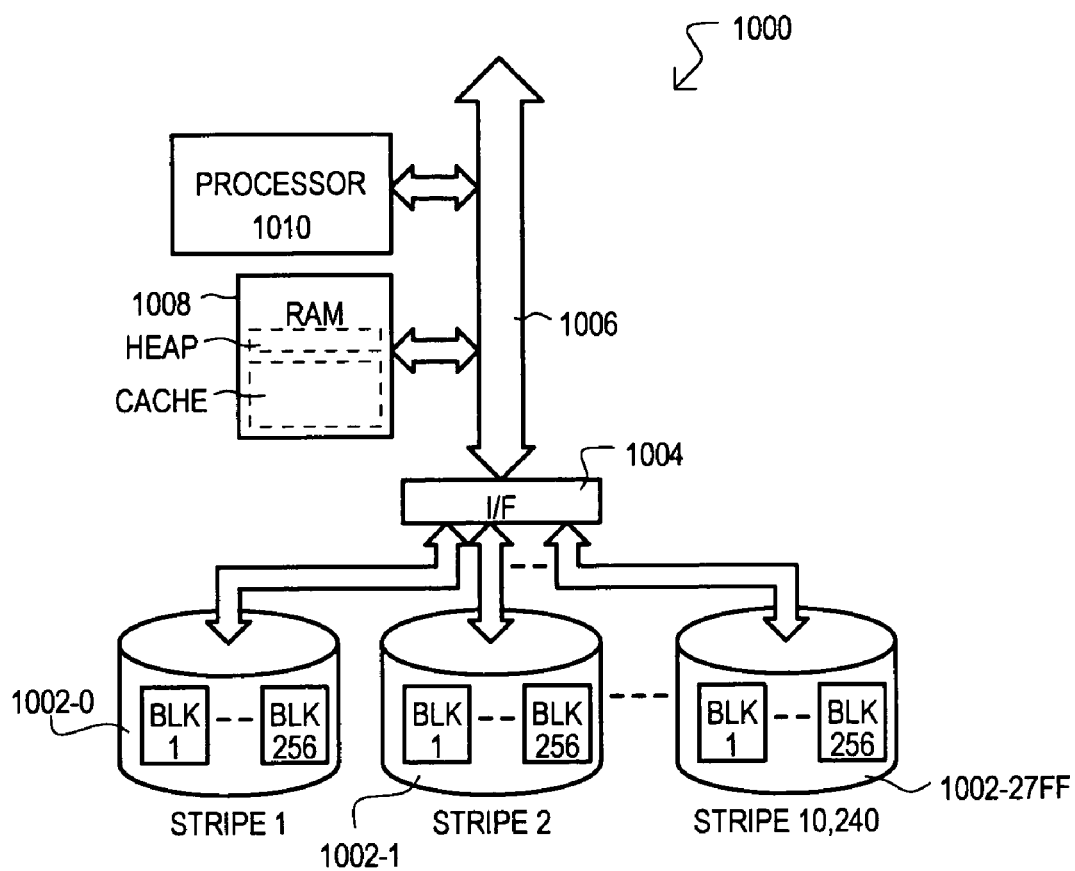
FIG. 10 is a block diagram of a conventional data storage system.

In yet another alternate embodiment, data for a table IsAnyStripeWithCount can be stored in an aggregated software bitmap data structure. This way, by accessing multiple levels of the bit map, a highest count value Active Stripe can be found. One of the many possible examples of such an arrangement is shown in FIG. 9. FIG. 9 shows a bit map array comprised of 8-bit addressable locations, each bit of which can represent a count value. Such an arrangement can involve multiple steps, which can stress or load processor, however. Thus, a TCAM table remains a preferred method.

The above embodiments can be faster than conventional approaches, as searches on TCAM tables can yield search results faster than stepwise algorithmic searches. The above embodiments may also be easily implemented in hardware. For example, a standard TCAM can be used to store the TCAM tables noted above.

The above embodiments can perform operations in a relatively small number of steps, independent of the number of Active Stripes. This is in contrast to either N or $\log_2 N$ steps, as in conventional arrangements.

The above steps can be rapidly implemented by a processor attached to a TCAM. Thus, the amount of specialized hardware can be minimal.

The foregoing descriptions of specific embodiments can examples of the invention have been presented for purposes of illustration and description, and although the invention has been described and illustrated by certain of the preceding examples, it is not to be construed as being limited thereby. The above described embodiments are not intended to be exhaustive or to limit the invention to the precise forms disclosed.

It is also understood that the embodiments of the invention may be practiced in the absence of an element and or step not specifically disclosed. That is, an inventive feature of the invention can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. In a data storage system having bulk storage devices that can store a body of data over separately accessed stripes, each stripe including a plurality of data blocks, and a cache memory that stores predetermined data blocks, a method of cache maintenance, comprising the steps of:
    providing a ternary content addressable memory (TCAM) with a processor coupled thereto;
    tracking a block count for each active stripe with the processor and TCAM, the block count for each active stripe being the number of data blocks belonging to the same stripe that are stored in the cache memory, the tracking of the block counts including
    storing a plurality of different tables in the TCAM, at least two such tables including a first table having TCAM entries searchable by stripe identifier values to identify the block count for all active stripes, and a second table having TCAM entries searchable by stripe identifier values to identify addresses of data blocks of the active stripes that are stored in cache memory; and
    including at least one array that tracks the number of stripes having a given block count value.

2. The method of claim 1, wherein:
    the step of tracking the block count for each active stripe includes
    storing a third table in the TCAM that includes entries having block count values, and
    searching the third table to locate an active stripe with a predetermined block count value.

3. The method of claim 2, wherein:
    the method of cache maintenance includes a cache reclamation operation, and
    the step of searching the third table includes searching the third table to locate the active stripe having a highest count value with respect to the other active stripes.

4. The method of claim 2, wherein:
    the method of cache maintenance includes a cache reclamation operation that writes the data blocks of the active stripe having a highest count value to the bulk storage stripe corresponding to the active stripe.

5. The method of claim 1, wherein:
    the step of tracking the block count for each active stripe includes
    storing at least one table in a random access memory that includes block count values for active stripes.

6. The method of claim 1, wherein:
    the step of tracking a block count for each active stripe with the processor includes forming:
    a BlockTable that stores the logical address of each data block stored in the cache memory;
    a StripeTable that stores the logical address of each stripe having at least one data block stored in the cache memory and the block count for the stripe; and
    an IsAnyStripeWithCount table comprising at least M entries, where M is a maximum number of data blocks in a stripe, each entry corresponding to a block count j, and indicating if any active stripe has a block count of j.

7. The method of claim 6, wherein:
    the logical address of a stripe (S) is a subset of the logical address of the data block for that stripe; and
    the StripeTable comprises a plurality of entries having at least a stripe field that stores the logical address of a stripe and a count field that stores a block count value for the corresponding stripe that represents the number of data blocks for the stripe that are stored in the cache memory.

8. The method of claim 1, wherein:
    providing the TCAM includes providing a binary CAM with global masking capabilities.

9. The method of claim 1, further including:
    providing a random access memory (RAM) coupled to the processor, the RAM including the at least one array.

10. A data storage system, comprising:
    a plurality of bulk storage devices partitioned into a number of stripes, each stripe being partitioned into a plurality of data blocks;
    a cache memory having a faster access speed than the bulk storage devices that store selected data blocks;
    a ternary content addressable memory (TCAM) coupled to a processor adapted to track the number of data blocks present in the cache memory belonging to each stripe, such a number being a count value of the stripe, the TCAM searchable to identify a maximal stripe in single, non-algorithmic search operation, the maximal stripe being a stripe with the most data blocks in the cache memory; and
    a random access memory (RAM) that stores an array that tracks the number of stripes that have a given count value.

11. The data storage system of claim 10, wherein:
    the TCAM comprises at least one binary CAM having global masking capabilities.

12. The data storage system of claim 10, wherein:
    the TCAM comprises at least one table formed in TCAM entries, the at least one table searchable to locate a stripe with a predetermined count value, the TCAM entries of the at least one table being searchable in parallel.

13. The data storage system of claim 10, wherein:
    the RAM array comprises an InverseCountArray having at least M elements, each element corresponding to a possible non-zero count value, the value M being the maximum number of blocks in a stripe.

14. A data storage system, comprising:
    a ternary content addressable memory (TCAM) that receives search key values and outputs a highest count stripe value that identifies one of multiple stripes of data that has a highest number of data blocks stored in a cache memory, the TCAM including at least
    a first table having TCAM entries that store count indications that identify the number of data blocks from a same stripe that are stored in the cache memory,
    a second table having TCAM entries that store count indications with a stripe identifier and searchable by search key that includes a count indication value to identify the stripe corresponding to the count indication, each entry of the second table generates an index value that corresponds to an associated data location storing the count indication and stripe identifier of the matching entry, and
    a third table having TCAM entries that store data block identifiers for each data block stored in the cache memory and searchable by search key that includes a stripe identifier to identify the data blocks corresponding to the stripe identifier.

15. The data storage system of claim 14, wherein:
    each entry of the first table generates an index value that corresponds to the number of data blocks for the TCAM entry when a search key matches the entry.

16. The data storage system of claim 14, wherein:
    the TCAM comprises a binary CAM having global masking capabilities.

* * * * *